(12) United States Patent
Hayes et al.

(10) Patent No.: US 7,231,335 B2
(45) Date of Patent: Jun. 12, 2007

(54) METHOD AND APPARATUS FOR PERFORMING INPUT/OUTPUT FLOOR PLANNING ON AN INTEGRATED CIRCUIT DESIGN

(75) Inventors: Jerry D. Hayes, Milton, VT (US); Amol Anil Joshi, Essex Junction, VT (US); Natesan Venkateswaran, Wappingers Falls, NY (US); William John Wright, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/604,107

(22) Filed: Jun. 26, 2003

(65) Prior Publication Data

US 2004/0267511 A1 Dec. 30, 2004

(51) Int. Cl.
*G06F 17/50* (2006.01)
(52) U.S. Cl. .................................. 703/14; 716/8
(58) Field of Classification Search .................. 703/14; 716/8
See application file for complete search history.

(56) References Cited

U.S. PATENT DOCUMENTS

| | | | | |
|---|---|---|---|---|
| 5,557,531 A | * | 9/1996 | Rostoker et al. | 716/1 |
| 5,572,437 A | * | 11/1996 | Rostoker et al. | 716/18 |
| 5,933,356 A | * | 8/1999 | Rostoker et al. | 703/15 |
| 6,269,467 B1 | * | 7/2001 | Chang et al. | 716/1 |
| 6,321,366 B1 | * | 11/2001 | Tseng et al. | 716/6 |
| 6,694,501 B2 | * | 2/2004 | Chang et al. | 716/10 |
| 6,845,489 B1 | * | 1/2005 | Mizuno et al. | 716/1 |

* cited by examiner

*Primary Examiner*—Paul Rodriguez
*Assistant Examiner*—Andre Pierre-Louis
(74) *Attorney, Agent, or Firm*—Richard M. Kotulak; Dillon & Yudell LLP

(57) ABSTRACT

A method for performing input/output (I/O) floor planning on an integrated circuit design is disclosed. User design data related to I/O circuit associated with each package pin is initially collected. The collected user design data is then sorted according to operating conditions. Next, an I/O behavioral model and a package model are chosen based on the sorted data. A simulation deck is dynamically built with appropriate operating conditions. Finally, a simulation is performed through a circuit simulator using the chosen I/O behavioral model and the operating conditions.

8 Claims, 5 Drawing Sheets

METHOD AND APPARATUS FOR PERFORMING INPUT/OUTPUT FLOOR PLANNING ON AN INTEGRATED CIRCUIT DESIGN

BACKGROUND OF INVENTION

1. Technical Field

The present invention relates to integrated circuit designs in general, and, in particular, to a method and apparatus for designing integrated circuits. Still more particularly, the present invention relates to a method and apparatus for performing input/output floor planning on an integrated circuit design.

2. Description of Related Art

For optimal input/output (I/O) circuit placement, I/O floor planning is typically driven by both physical placement constraints and electrical placement constraints. Physical placement constraints dictate the valid locations on silicon at which an on-chip/off-chip driver or receiver can be placed. Examples of physical placement constraints range from space congestion caused by existing macro or clock tree placement to valid voltage regions for supporting rail voltages of an I/O circuit. Using a variety of physical placement constraints, an I/O floor planning tool, such as ChipBench, can determine valid voltage regions at which I/O circuits can be placed within an integrated circuit.

Electrical placement constraints dictate the amount of I/O circuit clusters that can be supported within a small local region. Examples of electrical placement constraints may include maximum allowable average currents ($I_{avg}$) for preventing electromigration, maximum allowable rate of change in current (di/dt) for preventing excessive rail collapse, and maximum allowable peak current ($I_{peak}$) for preventing excessive IR loss on a power rail. In order to evaluate whether an electrical placement constraint has been violated, an I/O floor planning tool estimates the $I_{avg}$, di/dt, and $I_{peak}$ values resulting from all the I/O circuits within an I/O circuit cluster and then compares the estimated $I_{avg}$, di/dt, and $I_{peak}$ values to the corresponding electrical placement constraints. If the estimated $I_{avg}$, di/dt, and $I_{peak}$ values exceed the corresponding electrical placement constraints, the I/O circuit cluster is considered as not electrically viable and needed to be modified, typically, by reducing the number of I/O circuits within the I/O circuit cluster.

Historically, the $I_{avg}$, di/dt, and $I_{peak}$ values used for each I/O driver have not considered the environment in which the I/O driver will operate. These values are supplied to the I/O floor planning tool as fixed values obtained using a "figure of merit" environment that may differ significantly from the customer's environment. A customer's environment is defined by the customer's off-chip loading conditions, the customer's operating temperature and voltages, and the package type. The difference between the customer's actual environment and the "figure of merit" environment assumed when determining fixed values for $I_{avg}$, di/dt, and $I_{peak}$ for each I/O circuit can cause those values to be either extremely conservative, which results in an increased turn around time during I/O floor planning, or extremely optimistic, which results in loss of performance or even chip failure.

Consequently, it would be desirable to provide an improved method for determining the $I_{avg}$, di/dt, and $I_{peak}$ values for I/O circuits within an integrated circuit design during the floor planning phase of the integrated circuit design.

SUMMARY OF INVENTION

In accordance with a preferred embodiment of the present invention, user design data related to I/O circuits associated with each package pin are initially collected. The collected user design data is then sorted according to predetermined operating conditions. Next, an I/O behavioral model and a package model are chosen based on the sorted data. A simulation deck is dynamically built with appropriate operating conditions. Finally, a simulation is performed through a circuit simulator using the chosen I/O behavioral model and the operating conditions.

All objects, features, and advantages of the present invention will become apparent in the following detailed written description.

BRIEF DESCRIPTION OF DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

The present invention combines analog input/output (I/O) behavioral modeling with SPICE simulation capabilities in order to realize a fast, accurate I/O floor planning methodology. In order to remove the uncertainty when using fixed figure-of-merit values for evaluating maximum allowable average current for preventing electromigration ($I_{avg}$), maximum allowable rate of change in current for preventing excessive rail collapse (di/dt), and maximum allowable peak current for preventing excessive IR loss on a power rail ($I_{peak}$), the present invention provides a method for dynamically determining the above-mentioned three values as a function of the physical characteristics from a customer's environment.

Figure 1:
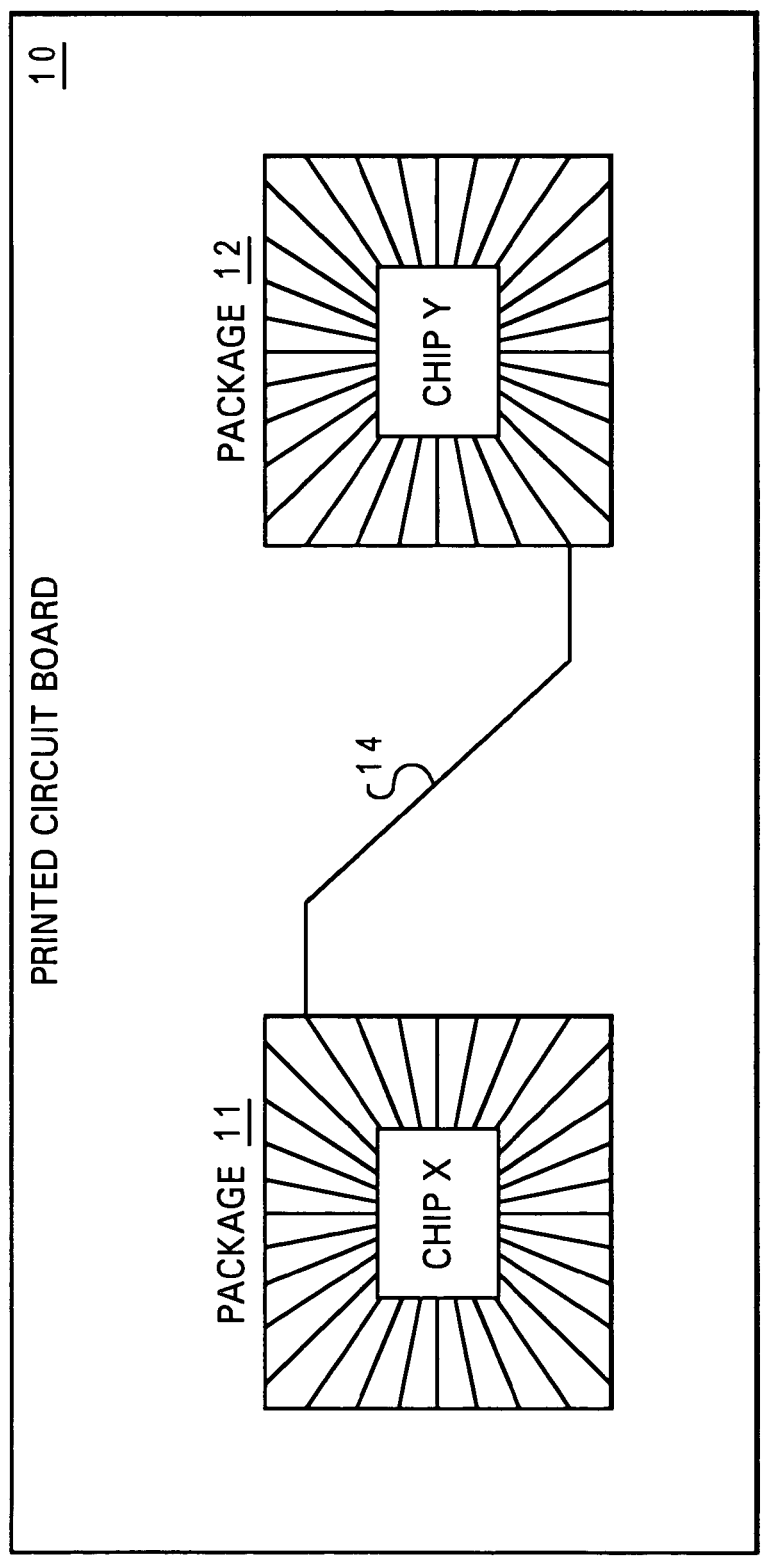
FIG. 1 is a diagram of a printed circuit board.

Referring now to the drawings and in particular to FIG. 1, there is depicted a diagram of a printed circuit board (PCB). As shown, a PCB 10 contains a chip package 11 and a chip package 12 interconnected by a PCB backplane 14. For functionality in the present example, an circuit from a chip X within chip package 11 must be able to communicate with various I/O circuits from a chip Y within chip package 12. The environment that a driver on chip X "sees" when communicating with an receiver on chip Y is defined by the parasitic of package 11, the parasitic of PCB backplane 14, and the parasitic of package 12.

Figure 2:
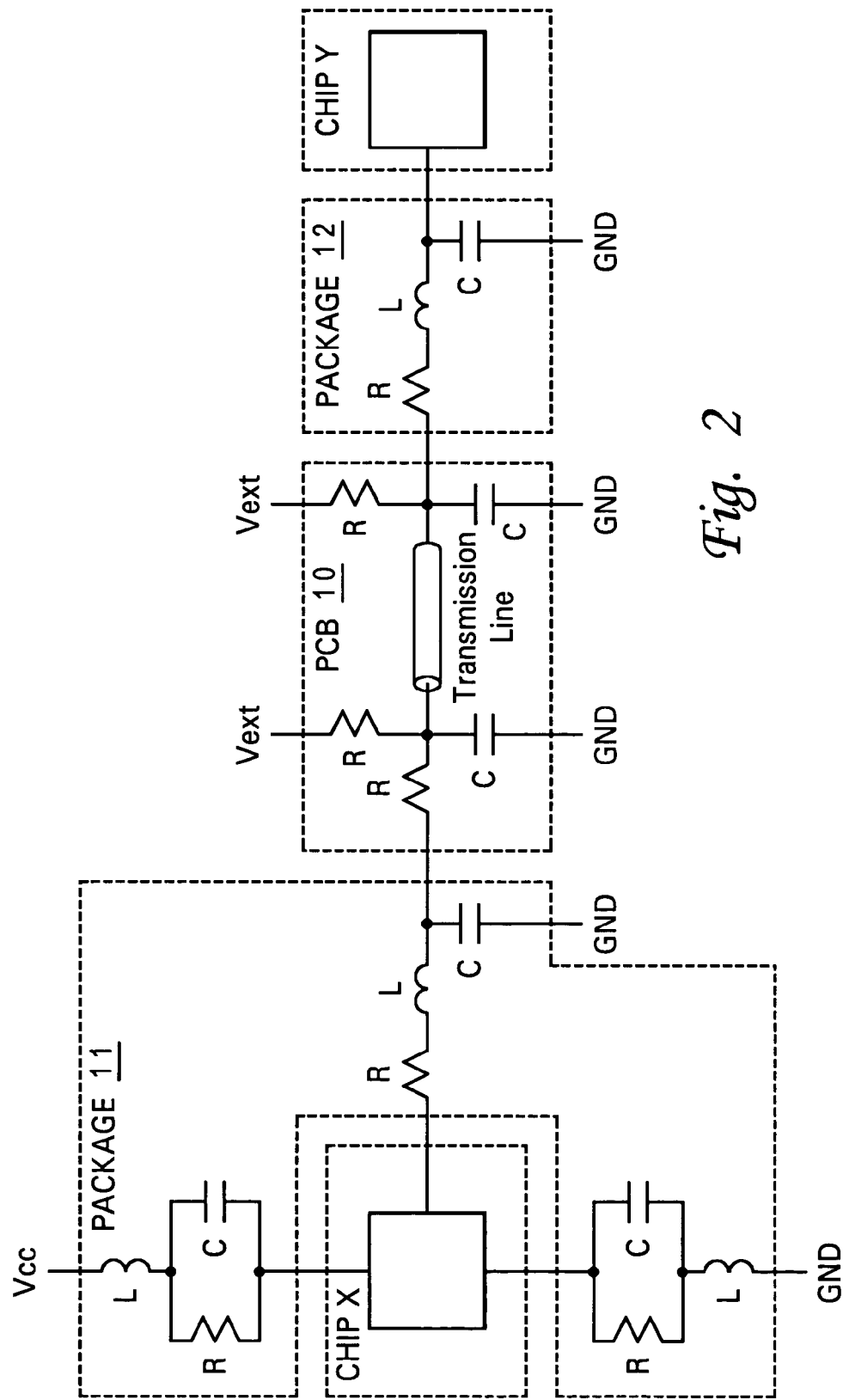
FIG. 2 is a circuit diagram representing the electrical environment of the printed circuit board from FIG. 1 from the perspective of an off-chip driver.

With reference now to FIG. 2, there is illustrated a circuit diagram representing the electrical environment of PCB 10 from the perspective of an off-chip driver. The values for each parameter is highly dependent upon the package type used at both the driving and receiving end as well as the layout of PCB 10. Typically, the silicon parasitic, known as pad transfer characteristics can be omitted because they are small in comparison with the package parasitic. However, sometimes the pad transfer characteristics need to be accounted for, especially when impedance matching between a driver and a transmission line is being considered. Since the level of details required to model a customer's environment varies and is largely customer dependent, the customer plays a critical role in defining the required detail. However, such condition poses no limitations for the present invention as long as the environment can be described electrically, typically using SPICE models.

Figure 3:
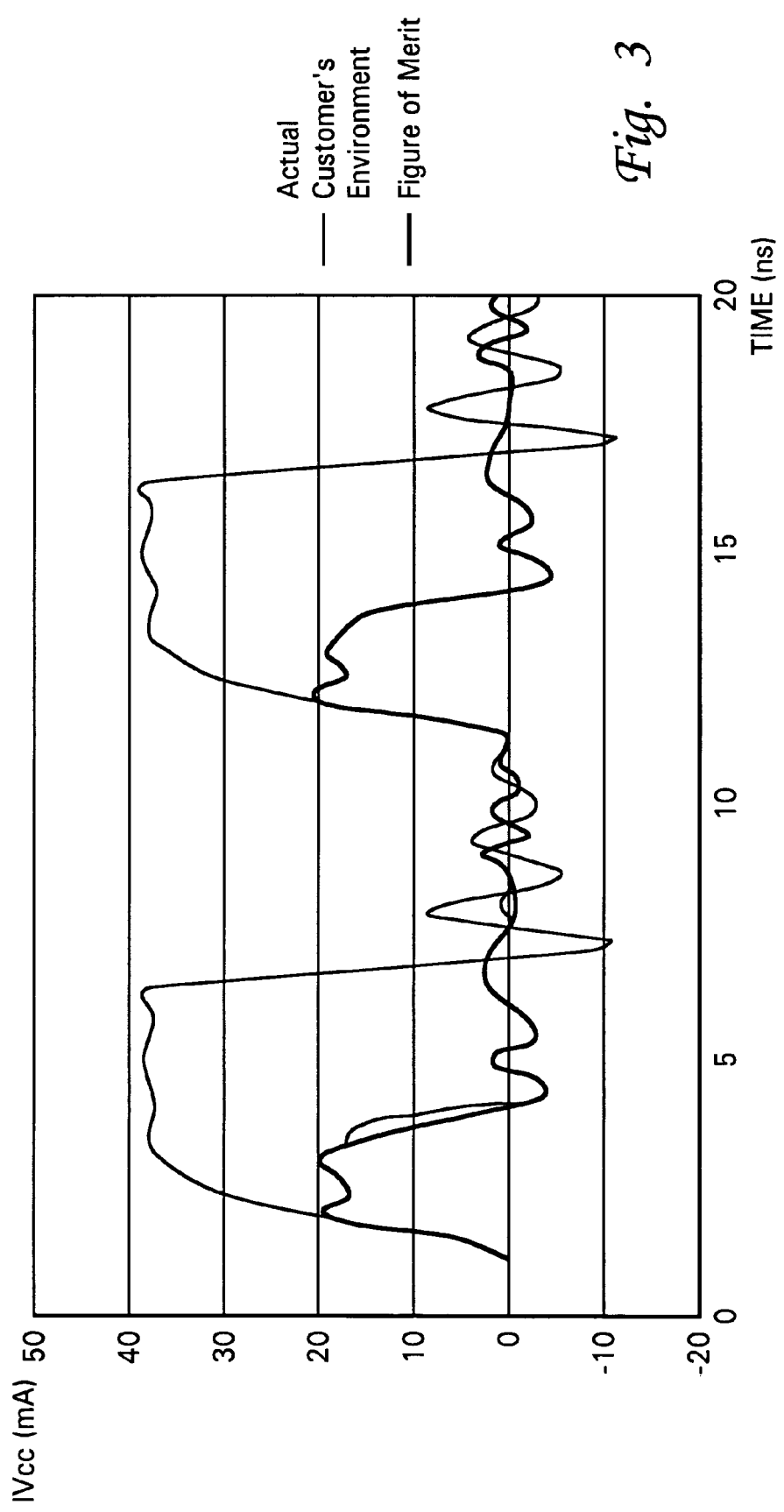
FIG. 3 is a diagram comparing a waveform for IVcc according to a customer's environment to a waveform for IVcc when using the conventional figure-of-merit approach.

With an adequate electrical representation of the customer's environment, the motivating factor for using the electrical shown in FIG. 2 in I/O floor planning for calculating $I_{avg}$, di/dt, and $I_{peak}$ values is summarized in FIG. 3. FIG. 3 depicts two waveforms an IVcc waveform based on a customer's environment and an IVcc waveform based on the conventional figure-of-merit approach. The difference in $I_{avg}$, di/dt, and $I_{peak}$ values of the two waveforms are significant. According to FIG. 3, $I_{avg}$, di/dt, and $I_{peak}$ values are clearly underestimated when using the figure-of-merit approach, which may lead to product failure.

The better waveform in FIG. 3 is the one obtained using the electrical parasitic of the customer's environment together with an analog representation of I/O circuits. Analog representations of I/O circuits are traditionally full SPICE netlist models containing detailed architectural and parasitic information. Such full SPICE netlist models provide the highest level of accuracy and can be used for a variety of analysis; however, such full SPICE netlist models also require excessive simulation times and are therefore not suitable for chip-level I/O floor planning.

Hence, instead of using full SPICE netlist models, the present invention uses high-level analog abstracts to represent an I/O circuit. Such high-level analog abstracts are commonly referred to as analog behavioral models that can simulate orders of magnitude faster than full SPICE netlist models while preserving a very high level of accuracy that is required for the I/O floor planning process.

Figure 4:
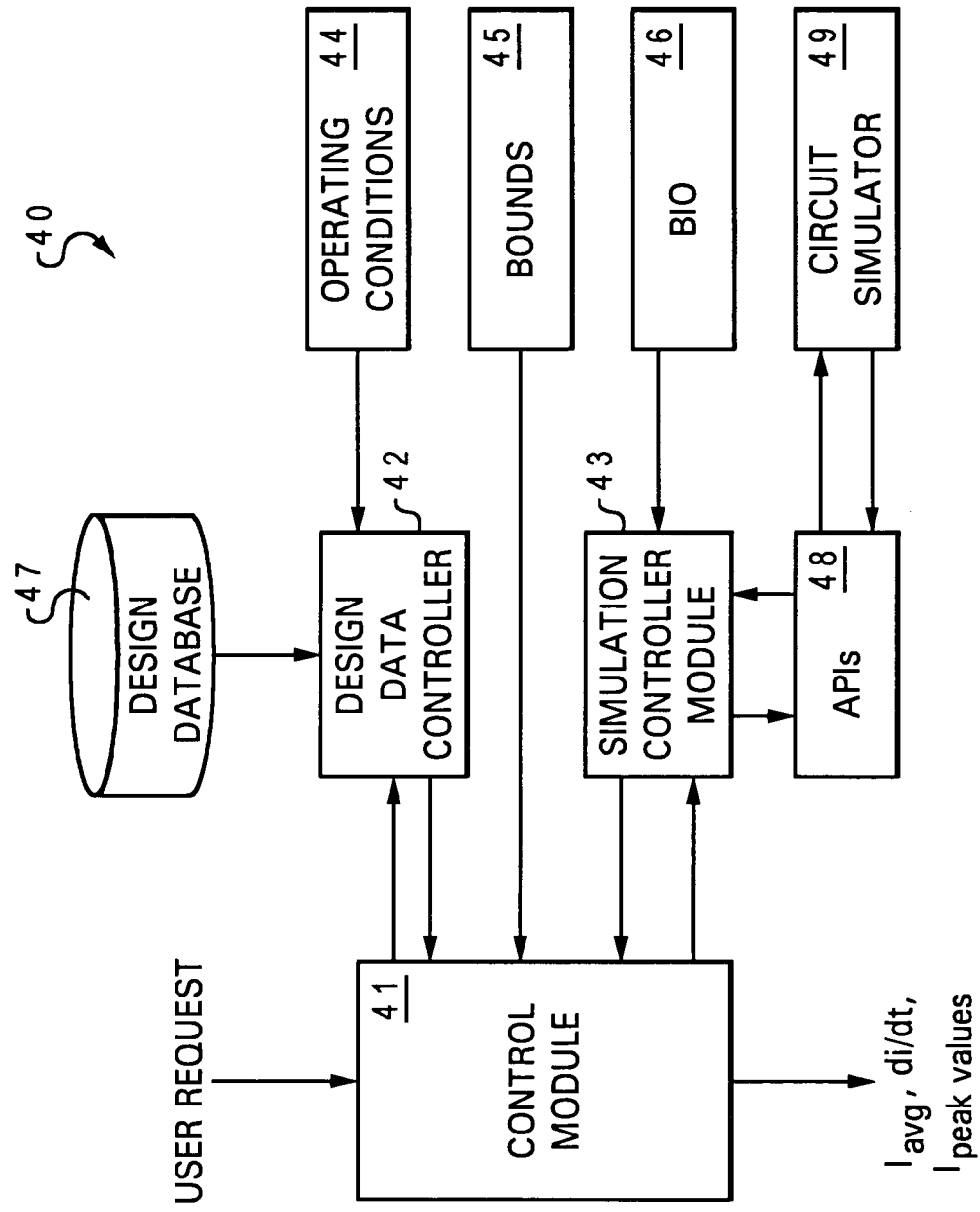
FIG. 4 is a block diagram of a system for using a behavioral input/output model and the electrical parasitic of a customer's environment for I/O floor planning, in accordance with a preferred embodiment of the present invention.

With reference now to FIG. 4, there is illustrated a block diagram of a system for using behavioral input/output (BIO) models and the electrical parasitic of a customer's environment for I/O floor planning, in accordance with a preferred embodiment of the present invention. As shown, a system 40 includes a control module 41, a design data controller 42, a simulation controller module 43, a design database 47, application programming interfaces (APIs) 48, and a circuit simulator 49. System 40 procures electrical data required for I/O floor planning by gathering the intelligence of electrical parameters. The validity of the gathered parameters are checked and the gathered parameters are then sorted to perform real-time simulations.

System 40 processes user requests based on some mandatory inputs and some optional inputs that are passed to control module 41. Control module 41 keeps a record of bounds and limits to various operating conditions in a bounds module 45 that a user can tune to suit to the user's environment. Bounds are essential to prevent the simulator from going astray due to human errors. Control module 41 then calls design data control module 42 that collects user design data from design database 47. Such user design data are related to I/O circuits that associates an I/O driver with each package pin. Control module 41 is also responsible for understanding the user's defined operation conditions 44 and for checking their validity against bounds module 45 to choose an appropriate condition needed for simulations. The design data is sorted based on consolidated operating conditions. The sorted design data is passed back to control module 41 by design data controller 42.

Control module 41 then uses the sorted design data to determine whether or not a simulation is needed to be performed on a package pin. When control module 41 finds unique record of design data and operating conditions associated with it, control module 41 calls simulation controller module 43 to build decks dynamically. Simulator module 43 chooses an appropriate BIO model from BIO model 46 and passes it to APIs 48 along with the operating conditions. APIs 48 use the data to invoke the call to circuit simulator 49. APIs 48 receive the results from circuit simulator 49 dynamically, and passes the results to simulation controller module 43. Simulation controller module 43 then processes the results further to obtain the required results as needed by the user. The results are passed back to control module 41 where data is stored for the user. If control module 41 finds an existing record, then control module 41 avoids the overhead of simulation time and copies the existing record with minor necessary calculations. The above-mentioned process repeats for every I/O circuit in design database 47. Control module 41 either interacts with the user by writing in files or interacts with the user by providing public interfaces to other tools.

System 40 is preferably embedded in a main floor planning tool as a dynamic link library. The main floor planning tool has an end user tool interface from which an end user can issue a command or request. The end user issues a request through the end user tool interface. The main floor planning tool resolves the end user's request and passes the end user's request to embedded electrical data generator functionality's main interface. The end user tool interface preferably includes two databases, namely, a static database and a centralized design database. Static database is based on technology in form of the libraries and user's specification to technology. Centralized design database can be used by different embedded tools and functionality.

Figure 5:
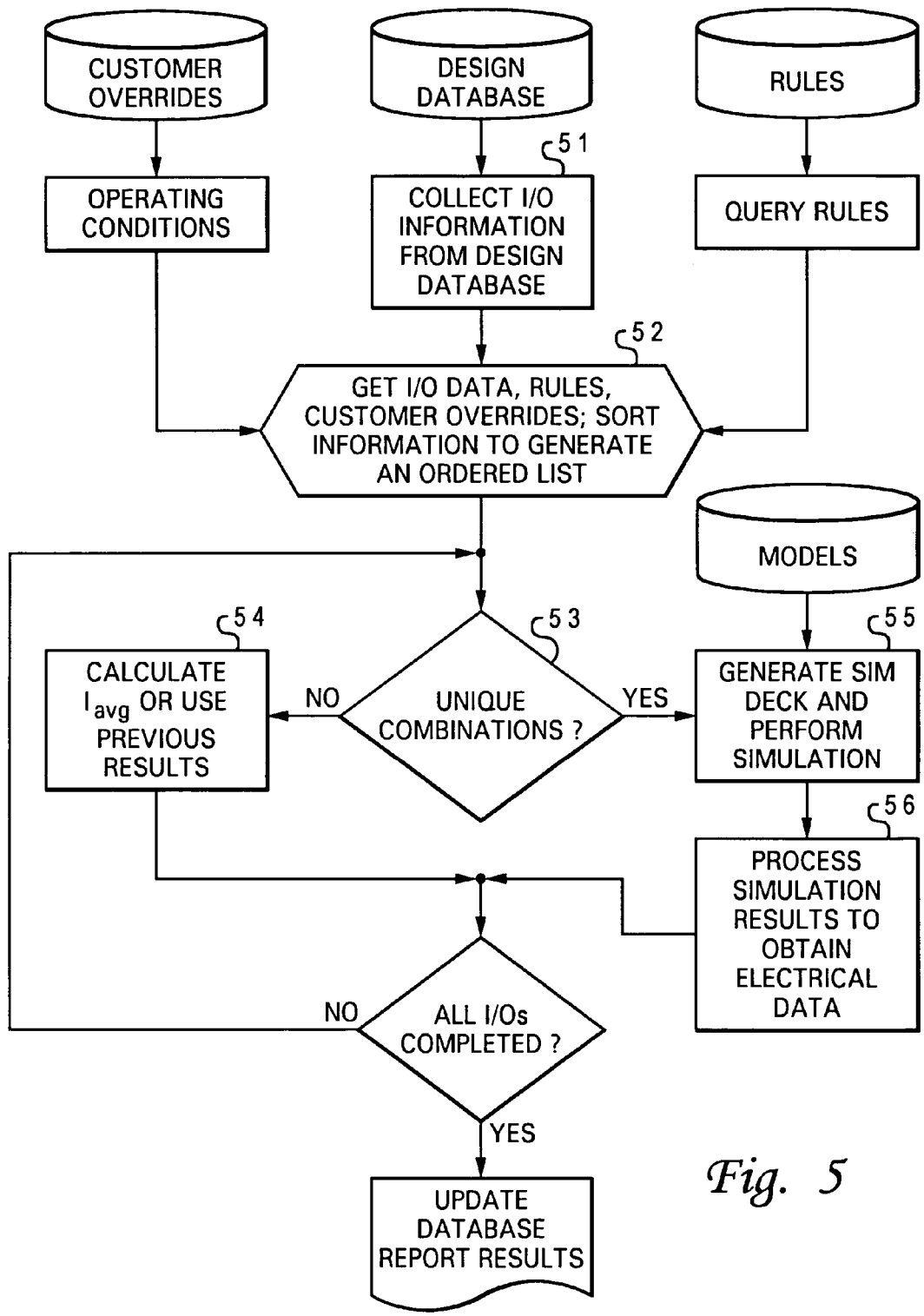
FIG. 5 is high-level logic flow diagram of a method for performing input/output floor planning on an integrated circuit design, in accordance with a preferred embodiment of the present invention.

Referring now to FIG. 5, there is depicted a high-level logic flow diagram of a method for performing floor planning on an integrated circuit design, in accordance with a preferred embodiment of the present invention. The end user tool interface resolves the end user's request and collects the required data from libraries, customer specification and centralized design database, as shown in block 51. The collected data are sorted according to optimize simulations, as depicted in block 52. A determination is made as to whether or not a unique combination exists for an I/O circuit, as shown in block 53. If a unique combination does not exist, then no simulation is required and previous results are used, as depicted in block 54, Otherwise, if a unique combination exists, then a simulation is required.

When there is a need for a simulation, the end user tool interface sends the data to a simulation interface. The simulation interface collects that data and builds an appropriate simulation deck required by the simulator, as shown in block 55. After building the deck, the programming interfaces of the simulator automatically triggers a core simulation engine to perform a simulation. The results from the simulation are received dynamically by a results interface, as depicted in block 56. The results interface can save the data in a centralized database of the main floor planning tool if the user decided to shut down the main floor planning tool. As such, the user can use the stored data whenever the user wants. The other method is that in the same working session the I/O placement tool can dynamically get that data and use the data to guide electrical parameters of different cost function. The dynamic generation of electrical data in the integrated tool environment with higher degrees of accuracy considering user defined conditions of temperature voltage and frequency, guides the placement tool, to balance the I/O placement physically and electrically at higher degrees.

As has been described, the present invention provides an improved method for performing I/O floor planning on an integrated circuit design. The present invention allows for complete automated solutions with enough flexibility for users to tune their environmental conditions. The present invention also provides validity of user parameters to avoid failures and deviations by appropriate warnings and messages.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

The invention claimed is:

1. A method for performing input/output (I/O) floor planning on an integrated circuit design, said method comprising:
    collecting design data related to an I/O circuit of said integrated circuit design from a plurality of libraries, customer specifications and design databases;
    sorting said collected design data for optimizing simulations of said I/O circuit under operating conditions;
    determining whether or not a simulation is required for said I/O circuit before performing I/O floor planning on said I/O circuit;
    in response to a determination that a simulation is required on said I/O circuit before performing I/O floor planning on said I/O circuit,
        sending said collected design data to a simulation interface;
        choosing an I/O behavioral model and a package model by said simulation interface based on said collected design data on said I/O circuit;
        dynamically building a simulation deck by said simulation interface using said chosen models along with appropriate operating conditions; and
        receiving simulation results by said simulation interface from a circuit simulator after a simulation had been performed by said circuit simulator using said simulation deck containing said chosen I/O behavioral model and said operating conditions; and
    performing I/O floor planning for said I/O circuit based on either the collected design data or said simulation results.

2. The method of claim 1, wherein said method further includes dynamically analyzing simulation results based on user defined criteria.

3. The method of claim 1, wherein said collecting further includes collecting design specification from a customer's environment condition.

4. The method of claim 1, wherein said sorting further includes sorting said collected design data according to a frequency of operation of said I/O circuit.

5. A system for performing input/output (I/O) floor planning on an integrated circuit design, said system comprising:
    means for collecting design data related to an I/O circuit of said integrated circuit design from a plurality of libraries, customer specifications and design databases;
    means for sorting said collected design data for optimizing simulations of said I/O circuit under operating conditions;
    means for determining whether or not a simulation is required for said I/O circuit before performing I/O floor planning on said I/O circuit;
    in response to a determination that a simulation is required on said I/O circuit before performing I/O floor planning on said I/O circuit,
        means for sending said collected design data to a simulation interface;
        means for choosing an I/O behavioral model and a package model by said simulation interface based on said collected design data on said I/O circuit;
        means for dynamically building a simulation deck by said simulation interface using said chosen models along with appropriate operating conditions; and
        means for receiving simulation results by said simulation interface from a circuit simulator after a simulation had been performed by said circuit simulator using said simulation deck containing said chosen I/O behavioral model and said operating conditions; and
    means for performing I/O floor planning for said I/O circuit based on either the collected design data or said simulation results.

6. The system of claim 5, wherein said system further includes means for dynamically analyzing simulation results based on user defined criteria.

7. The system of claim 5, wherein said means for collecting further includes means for collecting design specification from a customer's environment condition.

8. The system of claim 5, wherein said means for sorting further includes means for sorting said collected design data according to a frequency of operation of said I/O circuit.

* * * * *